United States Patent [19]
Eum

[11] Patent Number: 6,039,663
[45] Date of Patent: Mar. 21, 2000

[54] BELT STEERING APPARATUS FOR CONTROLLING INCLINED MOVEMENT OF AN ENDLESS ROTATING BELT

[75] Inventor: Jae-yong Eum, Suwon, Rep. of Korea

[73] Assignee: Samsung Electronics Co., Ltd., Kyungki-do, Rep. of Korea

[21] Appl. No.: 09/084,448

[22] Filed: May 27, 1998

[30] Foreign Application Priority Data

Aug. 14, 1997 [KR] Rep. of Korea ...................... 97-22233

[51] Int. Cl.⁷ ............................... F16H 7/08; F16H 7/22
[52] U.S. Cl. ........................................... 474/103; 101/102
[58] Field of Search .................................... 474/101–105, 474/133, 135; 74/89.17, 99 A, 110

[56] References Cited

U.S. PATENT DOCUMENTS

| | | | |
|---|---|---|---|
| 2,078,669 | 4/1937 | King | 474/103 X |
| 2,210,925 | 8/1940 | Hill | 474/103 X |
| 2,346,765 | 4/1944 | Kratz | 474/103 X |
| 5,078,263 | 1/1992 | Thompson et al. | 474/102 X |
| 5,352,167 | 10/1994 | Ulicny | 74/89.17 X |
| 5,390,557 | 2/1995 | Tsukada | 74/89.17 |

*Primary Examiner*—Mary Ann Battista
*Assistant Examiner*—Marcus Charles
*Attorney, Agent, or Firm*—Sughrue, Mion, Zinn, Macpeak & Seas, PLLC

[57] ABSTRACT

A belt steering apparatus for controlling inclined movement of the belt in, for example, a printer. The belt steering apparatus includes a first frame supporting a cylindrical roller having a predetermined portion which contacts an endless rotating belt, a second frame hinged to the center of the first frame, and a sliding member capable of sliding linearly, installed at one side of the first frame, and having an upper surface supporting a rotary shaft formed at one end of the roller, inclined from the direction of linear movement by a predetermined angle. A rack gear is provided on one side of the sliding member, and a pinion gear is connected to a rotary shaft of a motor mounted to the first frame, contacting a predetermined portion of the rack gear to linearly move the sliding member. Thus, the roller is easily tilted to forcibly raise and lower one side of the roller, and the pressure transferred from the belt can be withstood reliably.

4 Claims, 4 Drawing Sheets

BELT STEERING APPARATUS FOR CONTROLLING INCLINED MOVEMENT OF AN ENDLESS ROTATING BELT

BACKGROUND OF THE INVENTION

1. Field of the Invention

The present invention relates to a belt steering unit employed for a printer and, more particularly, to a belt steering apparatus for controlling inclined movement of a belt capable of being circulated by at least two rollers.

2. Description of the Related Art

Referring to FIG. 1 which shows a typical electrophotographic printer, a resetting apparatus 15, laser scanning units 16, developing apparatuses 17, a drying apparatus 18 and a transfer apparatus 20, are adjacent to the circulation path of a photosensitive belt 14 circulated by three rollers 11, 12 and 13, and are arranged in a predetermined space.

In the printing process, each laser scanning unit 16 scans laser beams over the photosensitive belt 14 circulating via the resetting apparatus 15. An electrostatic latent image is formed on the photosensitive belt 14 by the scanned laser, and the electrostatic latent image is developed by a developer supplied by the developing apparatus 17. A color image is formed on the photosensitive belt 14 by the laser scanning units 16 scanning laser beams having different color information and the developing apparatuses 17 developing the scanned color information image with developing materials corresponding thereto. The color image formed on the photosensitive belt 14 by the developing material is first transferred to a transfer roller 21 rotating in contact with the photosensitive belt 14, via the drying apparatus 18, according to movement of the photosensitive belt 14. Then, the image is transferred from the transfer roller 21 onto a sheet of paper 23 which moves forward between the transfer roller 21 and the pressure roller 22.

Meanwhile, the photosensitive belt 14 must be kept on a constant path during the above printing. Referring to FIG. 2 which shows a conventional belt steering apparatus for controlling the path of the photosensitive belt 14, a roller 13 is installed on a first frame 30. The first frame 30 is hinged at hinge H to a second frame 40 connected to a main body (not shown). Rotary shafts 13a of the roller 13 pass through grooves 31 and 32 at the sides of the first frame 30 and are retained by plates P, P'.

A circular plate type cam member 35 is connected to the rotary shaft 34 of a motor 33 installed on one side of the first frame 30. One of the rotary shafts 13a of the roller 13 is fitted into a curved groove 36 of the cam member 35 having a radius which varies at a predetermined rate. Thus, the rotary shaft 13a of the roller 13 is raised and lowered by rotation of the motor 33.

The support structure of the cam member 35 and the motor 33 for raising and lowering the roller 13 with respect to the first frame 30 cannot withstand the pressure of the photosensitive belt 14 on the roller 13. In the support structure, when the roller 13 is moved to tighten the photosensitive belt 14, the pressure of the photosensitive belt 14 against the roller 13 is increased. Thus, the expansion range of the photosensitive belt 14 is limited.

SUMMARY OF THE INVENTION

To solve the above problems, it is an objective of the present invention to provide a belt steering apparatus having a structure in which raising and lowering of a roller can be easily controlled to suppress inclined movement of the belt, and which reliably withstands pressure transferred from the belt.

Accordingly, to achieve the above objective, there is provided a belt steering apparatus for controlling inclined movement of an endless rotating belt, including: a cylindrical roller having a predetermined portion which contacts the endless rotating belt, the cylindrical roller having a rotary shaft disposed on at least one end thereof; a first frame which supports the cylindrical roller; a second frame hinged to the center of the first frame; a sliding member operative to slide linearly, installed at one side of the first frame, and having an upper surface supporting the rotary shaft disposed at the one end of the cylindrical roller, the upper surface being inclined with respect to a direction of linear movement by a predetermined angle; a rack gear provided on one side of the sliding member; a motor having an output shaft and being mounted to the first frame; and a pinion gear connected to the output shaft of the motor, the pinion gear contacting a predetermined portion of the rack gear to linearly move the sliding member.

BRIEF DESCRIPTION OF THE DRAWINGS

The above objective and advantages of the present invention will become more apparent by describing in detail a preferred embodiment thereof with reference to the accompanying drawings, in which.

DETAILED DESCRIPTION OF THE PREFERRED EMBODIMENTS

Figure 3:
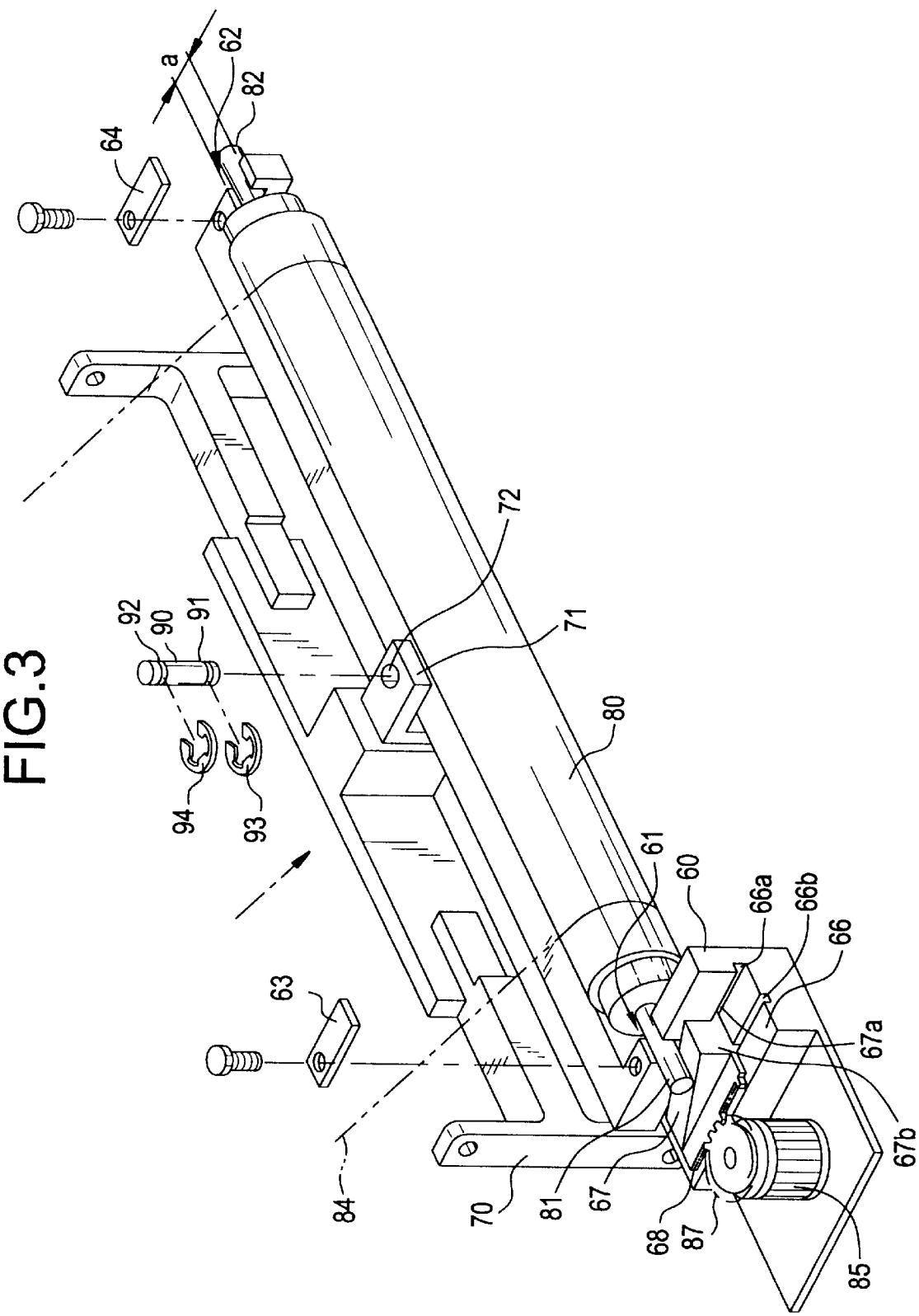
FIG. 3 is an exploded perspective view of a belt steering apparatus according to the present invention.

Referring to FIG. 3 which shows the belt steering unit according to the present invention, the roller 80 is rotatably installed in the first frame 60. The first frame 60 is hinged to a second frame 70 connected to a main body (not shown). In order to hinge the first frame 60 to the second frame 70, the first frame 60 has a hole (not shown) through which a cylindrical hinge pin 90 passes, formed perpendicular to the longitudinal axis of the roller 80 in the center of the first frame 60, and the second frame 70 has a hole 72 through which the hinge pin 90 passes, formed in a 'C'-shaped connection portion 71 of the second frame 70. Circlips or circular latches 93 and 94 fit into grooves 91 and 92 formed in each end of the hinge pin 90 to prevent the first and second frames 60 and 70 from separating.

Accordingly, the first frame 60 can pivot in a surface perpendicular to the longitudinal axis of the hinge pin 90 within a space between an inner wall of the 'C'-formed connection portion 71 of the second frame 70 and the first frame 60.

Grooves 61 and 62 of a predetermined depth are formed in both sides of the first frame 60, to receive rotary shafts 81 and 82 protruding from the ends of the roller 80. Also, retaining plates 63 and 64 close the openings of the grooves 61 and 62, retain the rotary shafts 81 and 82 of the roller 80 in the grooves 61 and 62. The width 'a' of each of the grooves 61 and 62 is similar to the outer diameters of the rotary shafts 81 and 82. Thus, the roller 80 can move up and down along a first direction which is a depth direction of the grooves 61 and 62.

A sliding member 67 capable of moving perpendicular to the longitudinal axis of the roller 80 is installed on a platform 66 formed on one side of the first frame 60. Guide bars 67a and 67b protrude from bottom and side surfaces of the sliding member 67, and interlock with slots 66a and 66b formed in the top and the side surfaces of the platform 66 for fitting the guide bars 67a and 67b to restrict the movement of the sliding member 67 to a straight line.

A rack gear 68 provided in the side surface of the sliding member 67 meshes with a pinion gear 87 connected to the output shaft of a motor 85 installed on the side of the first frame 60.

Figure 1:
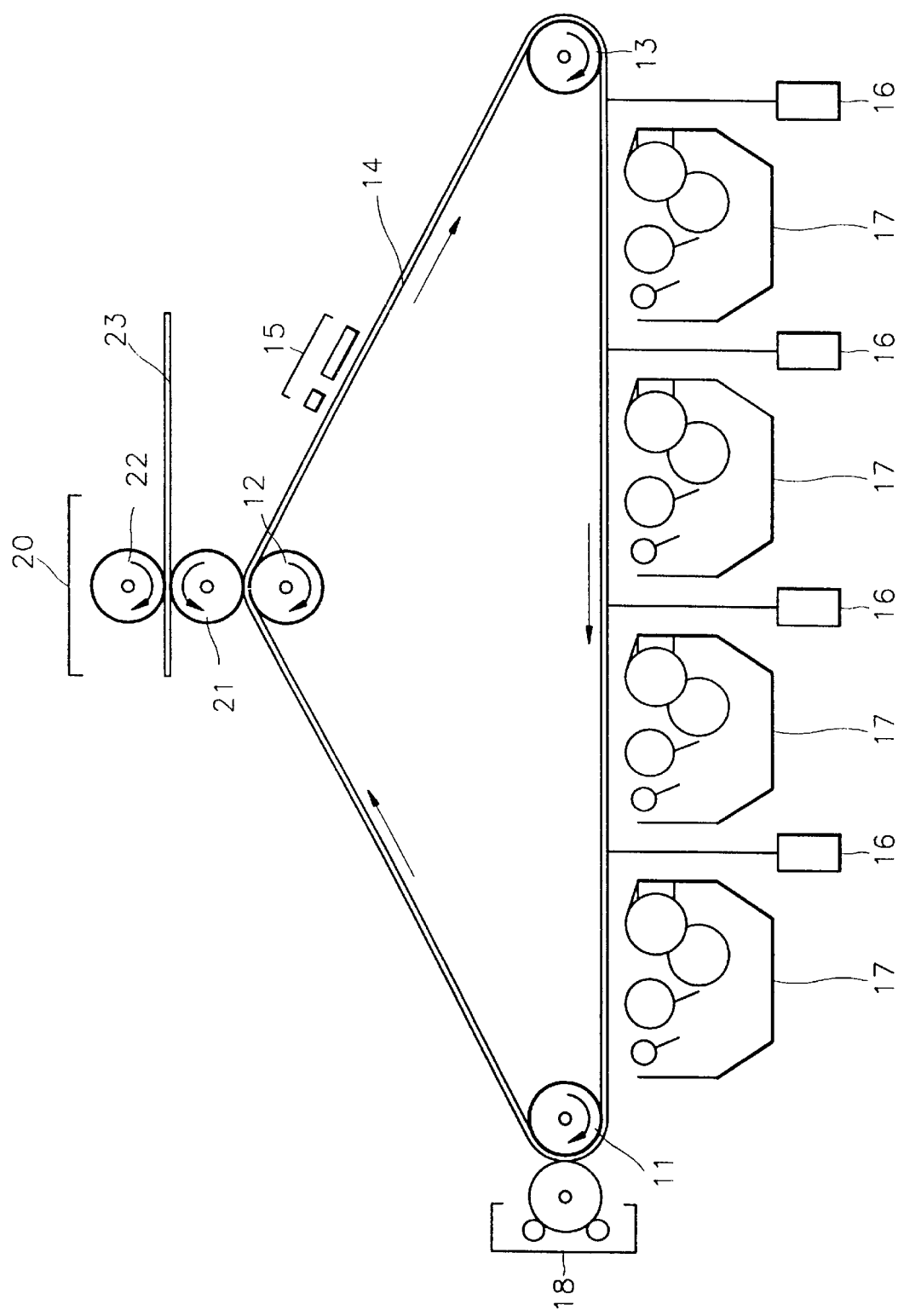
FIG. 1 is an explanatory drawing showing the structure of a typical printer.
Figure 2:
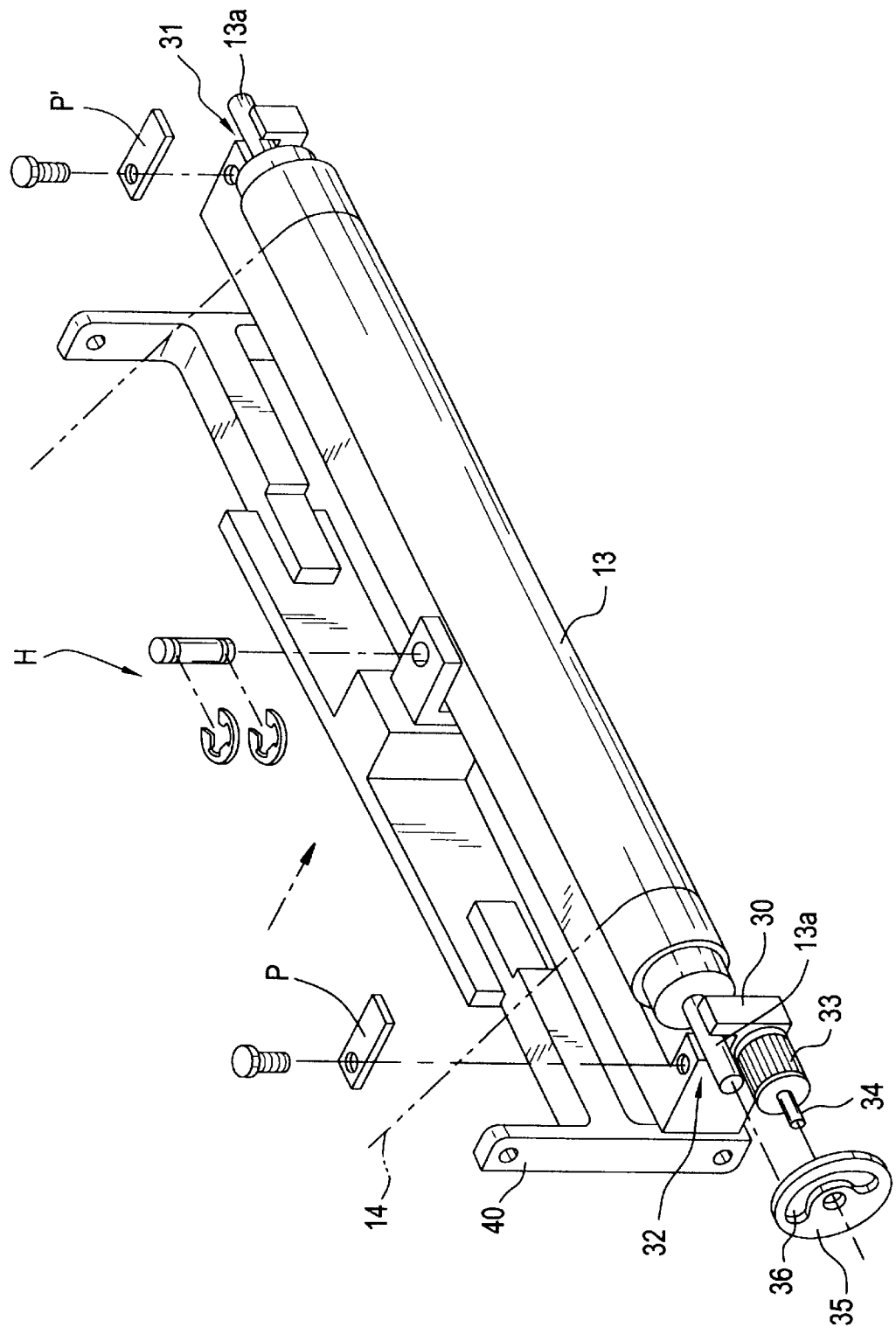
FIG. 2 is an exploded perspective view of a conventional belt steering apparatus employed in the printer of FIG. 1.
Figure 4:
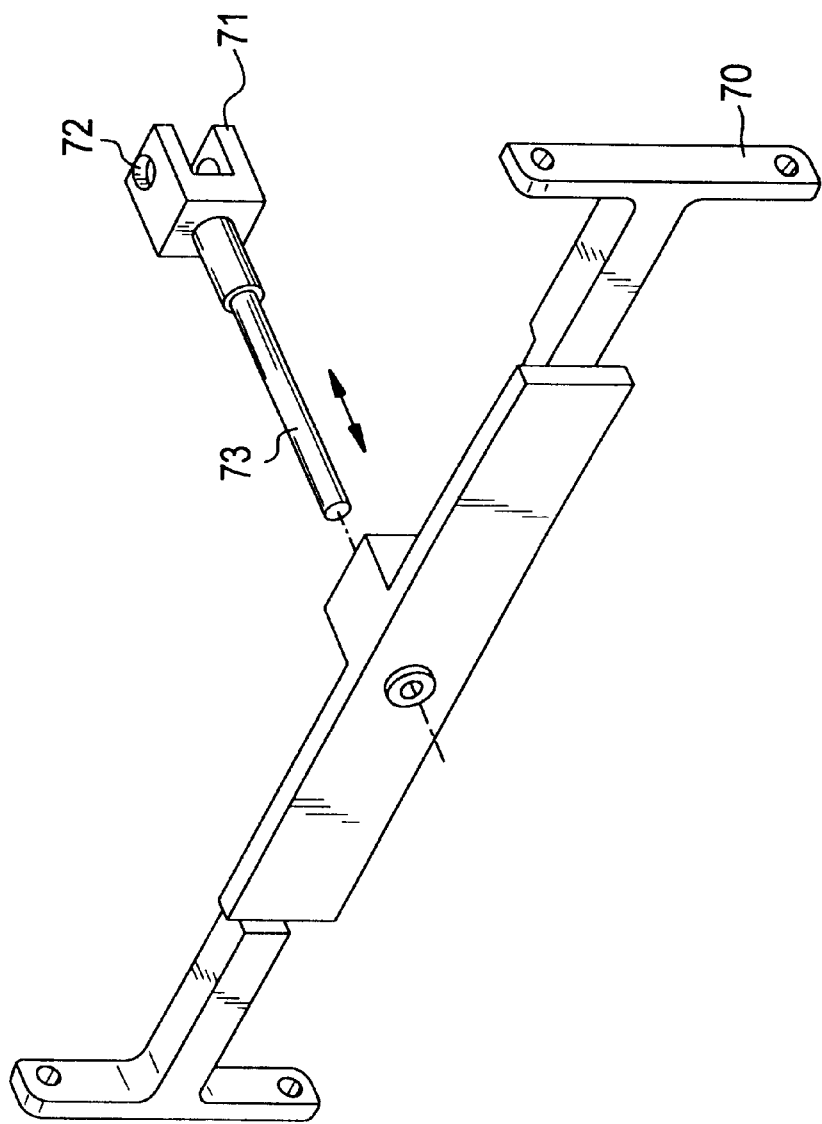
FIG. 4 is a perspective view of part of the belt steering apparatus of FIG. 3 which allows a roller to move toward and away from a second frame.

Preferably, when the belt steering unit is adopted by a system such as the printer (see FIG. 1), the first frame 60 can move toward or away from the second frame 70 connected to the main body, to control the tension of the belt 84 and allow easy installation and removal of the belt 84. For example, in FIG. 4, the 'C'-shaped connection portion 71 is installed on the second frame 70 so as to be capable of moving forward or backward. Thus, the roller 80 can also move forward or backward along with the shaft 73 connected to the 'C'-shaped connection portion 71.

The operation of the belt steering apparatus will be described with reference to FIG. 3.

When a belt steering apparatus of the present invention is provided in the printer (see FIG. 1), the second frame 70 is fixed to a main body of the printer. When the photosensitive belt 84 circulates in the direction indicated by an arrow, the roller 80 receives force downwardly and inwardly due to the pressure of the photosensitive belt 84. Thus, the rotary shaft 82 rotates against the bottom surface of the groove 62 due to the force pressing downwardly and inwardly, while the rotary shaft 81 is supported by the sliding member 67.

At this time, when there is a difference in the forces of the photosensitive belt 84 against the ends of the roller 80, the roller 80 pivots together with the first frame 60 with respect to the second frame 70, to balance the forces. When the first frame 60 pivots around the hinge pin 90 to a predetermined angle, the circulating photosensitive belt 84 may deviate from its path. Here, the roller 80 must be tilted to one side to generate a force to prevent the photosensitive belt 84 from deviating from its path. Thus, the motor 85 is driven, and the sliding member 67 is moved linearly by the pinion gear 87 and the rack gear 68, so that the rotary shaft 81 of the roller 80 supported by the sliding member 67 is raised and lowered in the desired direction.

The pressure of the photosensitive belt 84 on the roller 80 is transferred to the first frame 60 through the sliding member 67, so that the photosensitive belt 84 can be stably supported even when the pressure is increased due to an increase in tension.

As described above, according to the belt steering apparatus of the present invention, the roller can be easily tilted by raising and lowering one side of the roller, and the pressure transferred from the belt can be withstood reliably.

It is contemplated that numerous modifications may be made to the belt steering apparatus of the present invention without departing from the spirit and scope of the invention as defined in the following claims.

What is claimed is:

1. A belt steering apparatus for controlling inclined movement of an endless rotating belt, comprising:

a cylindrical roller having a predetermined portion which contacts the endless rotating belt, the cylindrical roller having a rotary shaft disposed on at least one end thereof;

a first frame which supports the cylindrical roller;

a second frame hinged to the center of the first frame;

a sliding member operative to slide linearly, installed at one side of the first frame, and having an upper surface supporting the rotary shaft disposed at the one end of the cylindrical roller, the upper surface being inclined with respect to a direction of linear movement by a predetermined angle;

a rack gear provided on one side of the sliding member;

a motor having an output shaft and being mounted to the first frame; and a pinion gear connected to the output shaft of the motor, the pinion gear contacting a predetermined portion of the rack gear to linearly move the sliding member.

2. The belt steering apparatus of claim 1, wherein a groove is formed in the first frame to receive the rotary shaft of the cylindrical roller.

3. The belt steering apparatus of claim 1, wherein the sliding member further comprises guide bars which protrude from a bottom surface and a side surface, respectively, of the sliding member, for slidably engaging with corresponding slots formed in the first frame.

4. The belt steering apparatus of claim 3, wherein the first frame includes a platform, which defines a top surface and a side surface, the slots being formed in the top and side surfaces of the platform.

* * * * *